US008194018B2

(12) United States Patent
Nagata (10) Patent No.: US 8,194,018 B2
(45) Date of Patent: Jun. 5, 2012

(54) LIQUID CRYSTAL DISPLAY DEVICE AND METHOD FOR DRIVING SAME

(75) Inventor: Hisashi Nagata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 366 days.

(21) Appl. No.: 12/449,026

(22) PCT Filed: Dec. 7, 2007

(86) PCT No.: PCT/JP2007/073655
§ 371 (c)(1),
(2), (4) Date: Jul. 21, 2009

(87) PCT Pub. No.: WO2008/114479
PCT Pub. Date: Sep. 25, 2008

(65) Prior Publication Data
US 2009/0303168 A1    Dec. 10, 2009

(30) Foreign Application Priority Data

Mar. 16, 2007   (JP) ................................ 2007-068209

(51) Int. Cl.
*G09G 3/36* (2006.01)
(52) U.S. Cl. ............. 345/87; 345/90; 345/204; 345/214
(58) Field of Classification Search ............ 345/87–100, 345/204, 210–214
See application file for complete search history.

(56) References Cited

U.S. PATENT DOCUMENTS 5,706,023 A    1/1998  Nagata et al.

6,172,663 B1 *  1/2001  Okada et al. .................... 345/96
(Continued)

FOREIGN PATENT DOCUMENTS

EP    0 336 570    10/1989
(Continued)

OTHER PUBLICATIONS

Supplementary European Search Report dated Jan. 17, 2011.

*Primary Examiner* — Nitin Patel
*Assistant Examiner* — Mansour M Said
(74) *Attorney, Agent, or Firm* — Harness, Dickey & Pierce, PLC (57) ABSTRACT

One embodiment of the present invention provides a liquid crystal display device in which auxiliary capacitance lines are driven, thereby allowing the range of drive voltage to be kept narrow while increasing the difference between the maximum and minimum absolute values of voltage to be applied to liquid crystal, and in the present liquid crystal display device, the voltage ranges for an auxiliary capacitance line drive signal, a video signal, and a common potential are equally maintained as low as from 0V to 4V, while inverting the common potential every scanning period and causing the potential of the auxiliary capacitance line drive signal to rise in the same direction as the common potential at the time of the fall of the scanning signal such that the potential is maintained until the next frame. With this configuration, it is possible to set the maximum absolute value of the voltage applied to the liquid crystal at about 5V, which corresponds to an effective value of the applied voltage, while setting the minimum value at about 1.5V, which is also an effective value of the applied voltage, thereby increasing the difference between the maximum and minimum values.

20 Claims, 6 Drawing Sheets

U.S. PATENT DOCUMENTS

| | | | |
|---|---|---|---|
| 6,229,515 B1 * | 5/2001 | Itoh et al. | 345/103 |
| 7,006,070 B2 * | 2/2006 | Ishiyama | 345/100 |
| 7,355,575 B1 * | 4/2008 | Ota et al. | 345/87 |
| 7,710,380 B2 * | 5/2010 | Nagato et al. | 345/99 |
| 8,115,757 B2 * | 2/2012 | Numao | 345/211 |
| 2004/0222958 A1 | 11/2004 | Nakamura et al. | |
| 2005/0012734 A1 * | 1/2005 | Johnson et al. | 345/211 |
| 2007/0057887 A1 | 3/2007 | Itakura et al. | |
| 2008/0062341 A1 * | 3/2008 | Tanaka | 349/38 |
| 2010/0309394 A1 * | 12/2010 | Numao et al. | 348/792 |

FOREIGN PATENT DOCUMENTS

| | | |
|---|---|---|
| JP | 2001-083943 | 3/2001 |
| JP | 2004-240263 | 8/2004 |

* cited by examiner

CONVENTIONAL ART

Fig. 6

CONVENTIONAL ART

Fig. 7

LIQUID CRYSTAL DISPLAY DEVICE AND METHOD FOR DRIVING SAME

TECHNICAL FIELD

The present invention relates to active-matrix liquid crystal display devices using switching elements, such as thin-film transistors, and methods for driving the same, more particularly to a liquid crystal display device and a drive method thereof, in which auxiliary capacitance lines are driven by changing voltage applied thereto.

BACKGROUND ART

Figure 2:
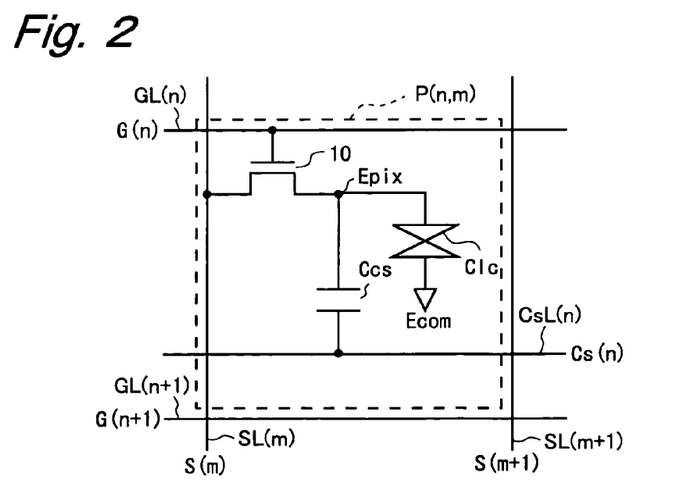
FIG. 2 is a circuit diagram illustrating an equivalent circuit of a pixel formation portion in the embodiment.

In general, a conventional active-matrix liquid crystal display device includes a display portion provided with a plurality (N) of scanning signal lines GL(1) to GL(N), a plurality (M) of video signal lines SL(1) to SL(M) crossing the scanning signal lines, and a plurality (M×N) of pixel formation portions P(1,1) to P(N,M) arranged in a matrix in accordance with intersections of the scanning signal lines and the video signal lines, each pixel formation portion including a liquid crystal capacitance (also referred to as a "pixel capacitance") Clc formed by a pixel electrode and an electrode (also referred to as a "common electrode") opposing the pixel electrode, as shown in FIG. 2 to be described later. Each pixel electrode is provided between two video signal lines SL(m) and SL(m+1), and connected to the video signal line SL(m) via a TFT 10.

Figure 1:
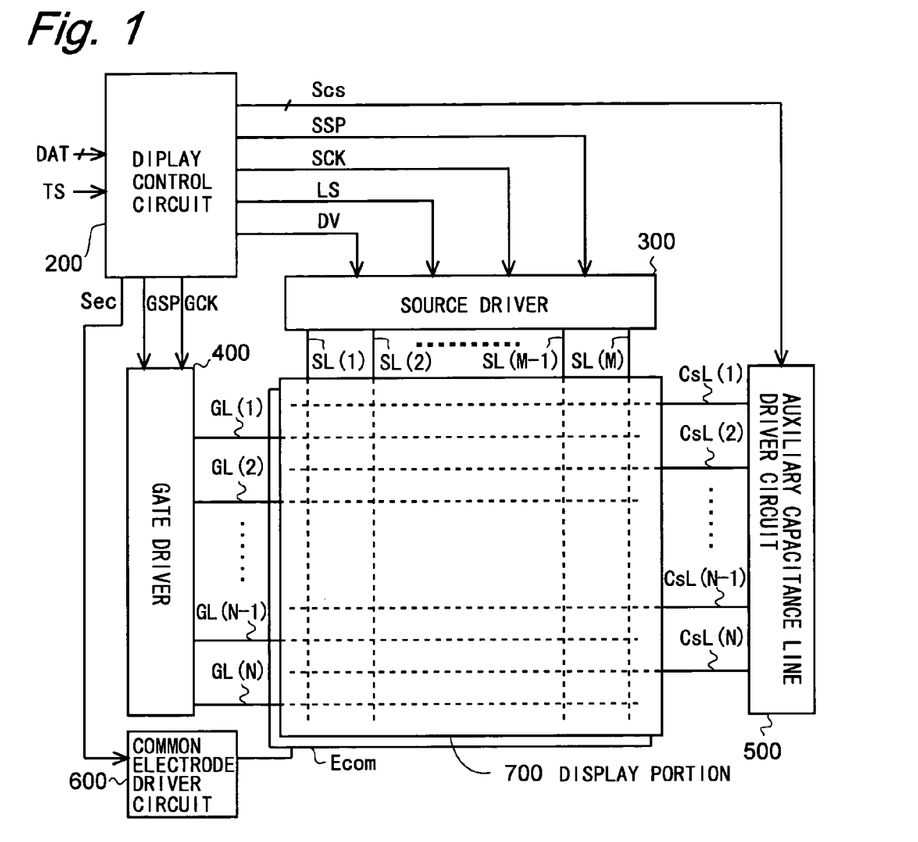
FIG. 1 is a block diagram illustrating the overall configuration of a liquid crystal display device according to an embodiment of the present invention.

Also, in the liquid crystal display device, a plurality (N) of auxiliary capacitance lines CsL(n) are formed in parallel to the scanning signal lines GL(n), as shown in FIG. 1 to be described later, and in each pixel formation portion P(n,m), an auxiliary capacitance Ccs is formed between the pixel electrode and the auxiliary capacitance line CsL(n).

In each pixel formation portion P(n,m) of the active-matrix liquid crystal display device as described above, when the TFT 10 connected to the pixel electrode is brought into ON state (conductive state), voltage from the video signal line SL(m) is applied via the TFT 10, and when the TFT 10 is brought into OFF state (non-conductive state), the applied voltage is retained in the liquid crystal capacitance Clc (and an auxiliary capacitance Ccs), so that pixel display is achieved in accordance with the retained voltage (n=1, 2, ..., N; m=1, 2, ..., M).

Here, in this conventional liquid crystal display device, after the TFT 10 is brought into OFF state, the voltage applied to the auxiliary capacitance line CsL(N) is changed, thereby changing the potential of the pixel electrode conforming to the common electrode (to which constant voltage Vcom is applied). Such a potential change will be described in detail with reference to FIGS. 6 and 7.

Figure 6:
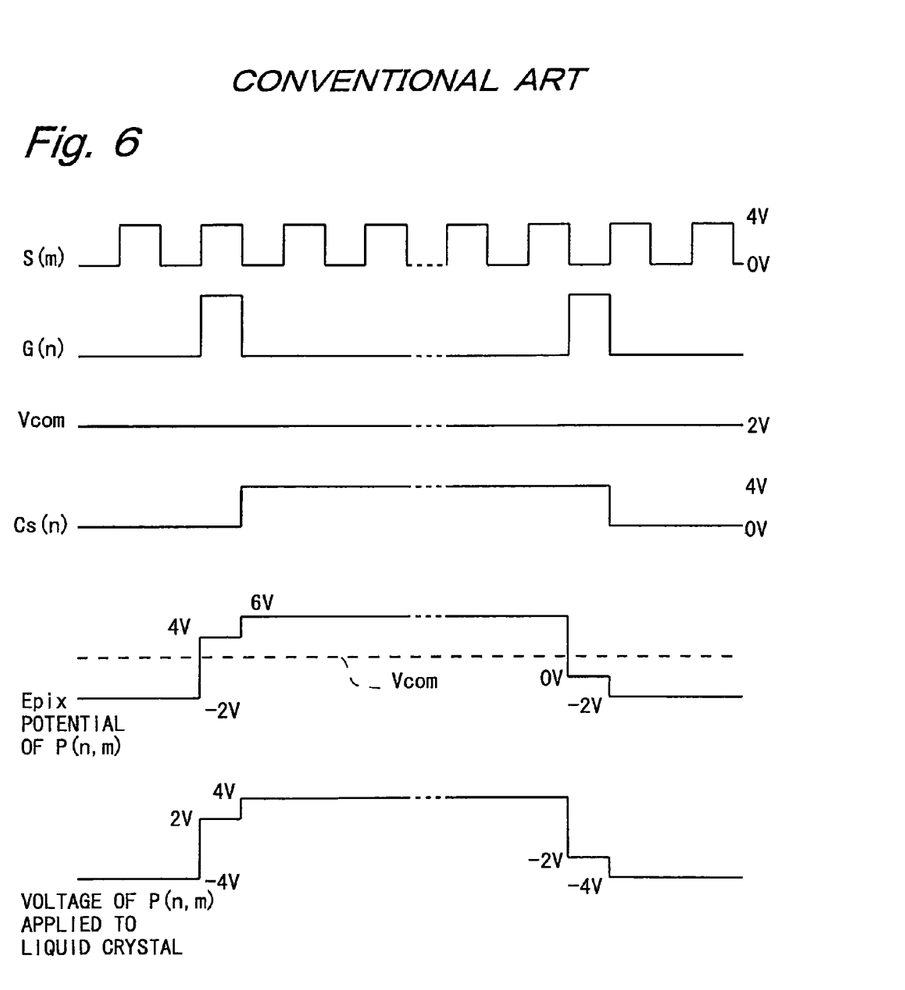
FIG. 6 provides waveform charts of various signals and the like for providing a white display in a conventional liquid crystal display device.
Figure 7:
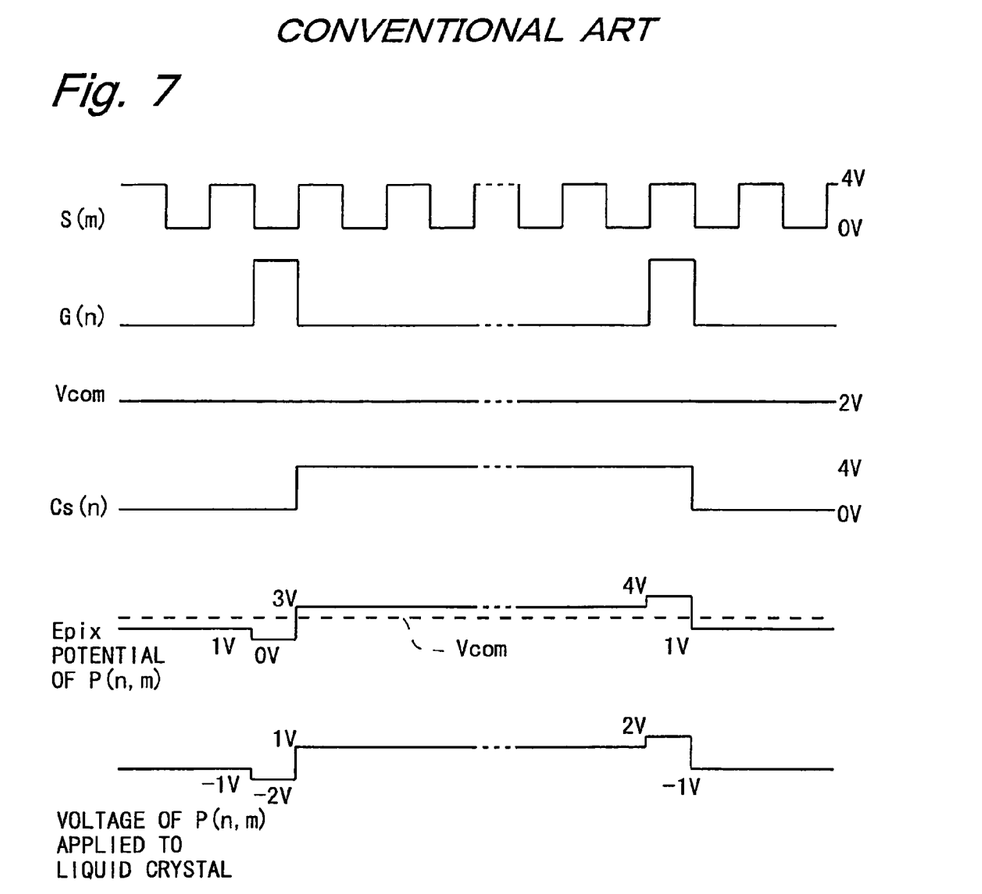
FIG. 7 provides waveform charts of various signals and the like for providing a black display in the conventional liquid crystal display device.

FIG. 6 provides waveform charts of various signals for providing a white display in a conventional liquid crystal display device, and FIG. 7 provides waveform charts of various signals for providing a black display in the conventional liquid crystal display device. A video signal S(m) shown in FIGS. 6 and 7, which is a voltage signal applied to the video signal line SL(m), has in reality a predetermined voltage value in accordance with a pixel luminance from 0V to 4V, but for ease of explanation, the video signal S(m) is shown in FIG. 6 to have a voltage value corresponding to the white display (maximum luminance), and in FIG. 7 to have a voltage value corresponding to the black display (minimum luminance). Note that by setting the lowest voltage of the video signal S(m) to 0V, it becomes possible to simplify the configuration of the power supply circuit, thereby minimizing power consumption as a whole.

Here, when the potential Vcom of the common electrode is fixed because alternating current drive is required for preventing a liquid crystal layer from experiencing time degradation, the common potential Vcom is often set at a midpoint voltage (in the variation width) of the video signal. By doing so, the potential of the pixel electrode conforming to the potential of the common electrode can alternate. In this case also, the common potential Vcom is set at 2V.

However, in the case of normally black liquid crystal display devices, the applied voltage is typically required to be at least about 4V in order to maximize the transmittance of the liquid crystal layer. Therefore, without any modification, the above configuration is not appropriate because the voltage applied to the liquid crystal varies in the range of ±2V. Note that in the case of normally white TN mode liquid crystal display devices also, as the voltage applied to the liquid crystal increases, black is displayed more deeply, resulting in enhanced contrast, and therefore the applied voltage in the range of ±2V is not appropriate.

Accordingly, in the conventional liquid crystal display device, the potential of the pixel electrode is changed by driving the auxiliary capacitance line CsL(n). Specifically, as is apparent from the relationship of connections shown in FIG. 2 to be described later, the potential of the pixel electrode Epix, when conforming to the common electrode Ecom, changes in accordance with the ratio of the auxiliary capacitance to the sum of the liquid crystal capacitance value Clc and the auxiliary capacitance value Ccs, as the potential of the auxiliary capacitance line CsL(n) changes. For example, in the case of the white display shown in FIG. 6, when the potential of a signal supplied to the auxiliary capacitance line (hereinafter, the signal being referred to as the "auxiliary capacitance line drive signal") Cs(n) is changed by 4V, the potential of the pixel electrode Epix is changed by 2V where the liquid crystal capacitance value Clc: the auxiliary capacitance value Ccs=1:1, i.e., Ccs/(Ccs+Clc)=0.5.

Accordingly, as shown in FIG. 6, the pixel electrode potential of the pixel formation portion P(n,m) is maintained at 4V when the scanning signal G(n) transitions from active state (where the TFT 10 is turned ON) to non-active state, and thereafter it rises by 2V to 6V due to the aforementioned potential change of the auxiliary capacitance line drive signal Cs(n). Since the common potential Vcom is 2V, the voltage applied to the liquid crystal layer at this time is 4V. Note that any potential change due to parasitic capacitance on the scanning signal line is not taken into account here.

Such a potential change occurs when pixel display is achieved with the white display (maximum luminance), but in the case of pixel display with the black display (minimum luminance), the potential change occurs in a different amount although in a similar manner. While liquid crystals in general have dielectric anisotropy, it is known that in the case of liquid crystals used for normally black liquid crystal display devices, the dielectric constant for the white display is higher than that for the black display, so that the liquid crystal capacitance value Clc for the white display is higher. Concretely, in the case of the aforementioned liquid crystal with Ccs/(Ccs+Clc)=0.5 for the white display, for example, Ccs/(Ccs+Clc)=0.75 for the black display.

Therefore, the pixel electrode potential of the pixel formation portion P(n,m) providing the black display is maintained at 0V when the scanning signal G(n) is brought into non-active state, as shown in FIG. 7, and thereafter rises by 3V, to 3V due to the aforementioned potential change (4V) of the auxiliary capacitance line drive signal Cs(n). Since the common potential Vcom is 2V, the voltage applied to the liquid crystal layer at this time is 1V. This voltage value is less than a liquid crystal threshold voltage value (typically, approximately 1.5V) at which liquid crystal molecules are driven, and therefore the optical transmittance of the liquid crystal layer becomes 0, which is suitable for the black display. The foregoing operation is the same for the pixel electrode potential of the pixel formation portion P(n+1,m) in the next row with an inverted polarity and for the pixel formation portion P(n,m) in the next frame. Such a liquid crystal display device in which auxiliary capacitance lines are driven with a fixed common potential Vcom is disclosed in, for example, Japanese Laid-Open Patent Publication No. 2001-83943. Hereinafter, such a conventional art example is referred to as the "first conventional art example".

Also, there is a conventional liquid crystal display device in which the common electrode Ecom is driven every scanning period, thereby changing the common potential Vcom so as to have a potential (e.g., 0V or 4V) opposite in polarity to the video signal S(m). With this conventional configuration, it is possible to apply voltage to the liquid crystal within the range of ±4V.

Note that in the above conventional configuration, it is not always necessary to drive the auxiliary capacitance line, and there is a conventional liquid crystal display device in which the auxiliary capacitance line is driven every scanning period in the same phase as the common electrode. With this conventional configuration, it is possible to drive the auxiliary capacitance line at a proper potential, thereby suppressing flicker, image memory phenomenon, etc. Such a conventional liquid crystal display device is disclosed in, for example, Japanese Laid-Open Patent Publication No. 2-913. Hereinafter, such a conventional art example is referred to as the "second conventional art example".

[Patent Document 1] Japanese Laid-Open Patent Publication No. 2001-83943

[Patent Document 2] Japanese Laid-Open Patent Publication No. 2-913

DISCLOSURE OF THE INVENTION

Problems to be Solved by the Invention

In the first conventional art example, the absolute value of the voltage applied to the liquid crystal is maximized to 4V at the time of the white display, and minimized to 1V at the time of the black display, but in the case of normally-black liquid crystal display devices, an applied voltage of approximately 5V is typically required for achieving 100% transmittance of the liquid crystal layer, as described above, and therefore, the aforementioned conventional liquid crystal display device has a problem where the maximum absolute value of the voltage applied to the liquid crystal is about 1V lower.

Therefore, in the first conventional art example, in order to increase the maximum value, it is conceivable to increase the maximum potential (i.e., signal amplitude) of the auxiliary capacitance line drive signal Cs(n). Here, by setting the maximum value to 6V, the maximum absolute value of the voltage applied to the liquid crystal can be 5V. However, this configuration results in increased production cost for the auxiliary capacitance line driver circuit, and furthermore, the minimum absolute value of the voltage applied to the liquid crystal becomes 2.5V, which is significantly larger than the liquid crystal threshold voltage value (typically approximately 1.5V) for the black display. Accordingly, in the case of the black display also, the display is provided with low luminance, resulting in reduced contrast, hence reduced display performance of the display device. In this manner, as the maximum absolute value of the voltage applied to the liquid crystal increases, the minimum absolute value of the voltage applied to the liquid crystal further increases, so that the difference between the maximum and minimum absolute values (i.e., "dynamic range") decreases, making it impossible to change the optical transmittance of the liquid crystal in the range from 0% to 100%.

Note that it is also conceivable to increase the auxiliary capacitance value in order to increase the maximum value, but as the auxiliary capacitance value increases, the pixel aperture ratio decreases, resulting in reduced display performance of the display device as well.

Also, in the second conventional art example, by driving the common electrode and auxiliary capacitance line in the range from 0V to 5V, it becomes possible to set the maximum absolute value of the voltage applied to the liquid crystal at 5V. However, the range (amplitude) of drive voltage for driver circuits for driving the common electrode and the auxiliary capacitance line is preferably as narrow as possible from the viewpoint of simplification of its voltage withstanding design, reduction of power consumption, and so on.

Therefore, an objective of the present invention is to provide a liquid crystal display device in which auxiliary capacitance lines are driven such that the range of drive voltage is kept narrow while increasing the difference between the maximum and minimum absolute values of voltage to be applied to liquid crystal.

Solution to the Problems

A first aspect of the present invention is directed to an active-matrix liquid crystal display device, comprising:

a video signal line driver circuit for driving a plurality of video signal lines transmitting a plurality of video signals corresponding to image signals externally provided for displaying a predetermined image;

a scanning signal line driver circuit for driving a plurality of scanning signal lines crossing the video signal lines;

an auxiliary capacitance line driver circuit for driving a plurality of auxiliary capacitance lines arranged along their corresponding scanning signal lines;

a plurality of pixel formation portions arranged in a matrix along the video signal lines and the scanning signal lines; and a common electrode driver circuit for driving a common electrode supplying a common potential to the pixel formation portions, wherein, each of the pixel formation portions includes a pixel electrode connected to a corresponding one of the video signal lines, the pixel electrode having a predetermined auxiliary capacitance formed between the pixel electrode and its corresponding auxiliary capacitance line and also having a liquid crystal interposed between the pixel electrode and the common electrode, the common electrode driver circuit alternatingly applies a first predetermined potential and a second predetermined potential greater than the first predetermined potential to the common electrode each time one of the scanning signal lines is selectively driven by the scanning signal line driver circuit or at each interval between more than one scanning signal line being driven by the scanning signal line driver circuit, and the auxiliary capacitance line driver circuit drives the auxiliary capacitance lines by applying a third predetermined potential or a fourth predetermined potential greater than the third predetermined potential at or after a first time point subsequent to selection of a corresponding scanning signal line by the scanning signal line driver circuit, the corresponding scanning signal line transitioning at the first time point from a selected state to a deselected state, such that the applied potential is changed in the same direction as a direction in which the potential of the common electrode is changed at or immediately after the first time point, the applied potential being maintained for a predetermined period until a second time point subsequent to the next selection of the corresponding scanning signal line or until a time point before and close to the second time point, the corresponding scanning signal line transitioning at the second time point from a selected state to a deselected state.

In a second aspect of the present invention, based on the first aspect of the invention, at least two of a fifth potential, which is a minimum value of the video signal, the first potential, and the third potential are approximately equal.

In a third aspect of the present invention, based on the second aspect of the invention, at least two of the fifth potential, which is the minimum value of the video signal, the first potential, and the third potential are 0V or values close to 0V.

In a fourth aspect of the present invention, based on the first aspect of the invention, at least two of a sixth potential, which is a maximum value of the video signal, the second potential, and the fourth potential are approximately equal.

In a fifth aspect of the present invention, based on the fourth aspect of the invention, at least two of the sixth potential, which is the maximum value of the video signal, the second potential, and the fourth potential are values lower than an absolute value of a minimum applied voltage allowing the liquid crystal to have an optical transmittance close to 100%.

In a sixth aspect of the present invention, based on the fifth aspect of the invention, at least two of the sixth potential, which is the maximum value of the video signal, the second potential, and the fourth potential are 4V or values close to 4V.

A seventh aspect of the present invention is directed to a method for driving a liquid crystal display device including a plurality of video signal lines transmitting a plurality of video signals corresponding to image signals externally provided for displaying a predetermined image, a plurality of scanning signal lines crossing the video signal lines, a plurality of auxiliary capacitance lines arranged along their corresponding scanning signal lines, a common electrode supplying a common potential, and a plurality of pixel formation portions arranged in a matrix along the video signal lines and the scanning signal lines, each of the pixel formation portions including a pixel electrode connected to a corresponding one of the video signal lines, the pixel electrode having a predetermined auxiliary capacitance formed between the pixel electrode and its corresponding auxiliary capacitance line and also having a liquid crystal interposed between the pixel electrode and the common electrode, the method comprising:

a video signal line drive step for driving the video signal lines;

a scanning signal line drive step for driving the scanning signal lines;

an auxiliary capacitance line drive step for driving the auxiliary capacitance lines; and a common electrode drive step for driving the common electrode, wherein, in the common electrode drive step, a first predetermined potential and a second predetermined potential greater than the first predetermined potential are alternatingly applied to the common electrode each time one of the scanning signal lines is selectively driven in the scanning signal line drive step or at each interval between more than one scanning signal line being driven in the scanning signal line drive step, and in the auxiliary capacitance line drive step, the auxiliary capacitance lines are driven by applying a third predetermined potential or a fourth predetermined potential greater than the third predetermined potential at or after a first time point subsequent to selection of a corresponding scanning signal line in the scanning signal line drive step, the corresponding scanning signal line transitioning at the first time point from a selected state to a deselected state, such that the applied potential is changed in the same direction as a direction in which the potential of the common electrode is changed at or immediately after the first time point, the applied potential being maintained for a predetermined period until a second time point subsequent to the next selection of the corresponding scanning signal line or until a time point before and close to the second time point, the corresponding scanning signal line transitioning at the second time point from a selected state to a deselected state.

EFFECT OF THE INVENTION

According to the first aspect of the present invention, with the configuration in which the auxiliary capacitance lines are driven such that the third or fourth potential is applied at or after the first time point so as to be changed in the same direction as the direction in which the potential of the common electrode is changed at the first time point, and the applied potential is maintained for a predetermined period until the second time point or a time point before and close to the second time point, it is possible to keep the range of drive voltage narrow, thereby facilitating voltage withstanding design for driver circuits, while increasing the difference between the maximum and minimum absolute values of voltage to be applied to the liquid crystal by taking advantage of dielectric anisotropy of the liquid crystal with respect to the applied voltage.

According to the second aspect of the present invention, at least two of the fifth potential, the first potential, and the third potential are approximately equal, which eliminates the need to generate a wide variety of potentials in the power supply circuit, making it possible to simplify the power supply circuit.

According to the third aspect of the present invention, at least two of the fifth potential, the first potential, and the third potential are 0V or values close to 0V, which makes it possible to suppress power consumption as a whole.

According to the fourth aspect of the present invention, at least two of the sixth potential, the second potential, and the fourth potential are approximately equal, which eliminates the need to generate a wide variety of potentials in the power supply circuit, making it possible to simplify the power supply circuit.

According to the fifth aspect of the present invention, at least two of the sixth potential, the second potential, and the fourth potential are values lower than an absolute value of a minimum applied voltage allowing the liquid crystal to have an optical transmittance close to 100%, which makes it possible to facilitate voltage withstanding design for driver circuits, while suppressing power consumption as a whole.

According to the sixth aspect of the present invention, at least two of the sixth potential, the second potential, and the fourth potential are 4V or values close to 4V, and therefore using general-purpose driver circuits makes it possible to particularly facilitate voltage withstanding design while suppressing power consumption as a whole.

The seventh aspect of the present invention achieves effects similar to those achieved by the first aspect of the invention on the method for driving a liquid crystal display device.

DESCRIPTION OF THE REFERENCE CHARACTERS

10 TFT (switching element)
200 display control circuit
300 source driver
400 gate driver
500 auxiliary capacitance line driver circuit
600 common electrode driver portion
700 display portion
Ecom common electrode
Vcom common potential
Epix pixel electrode
GL(n) scanning signal line (n=1 to N)
G(n) scanning signal (n=1 to N)
CsL(n) auxiliary capacitance line (n=1 to N)
Cs(n) auxiliary capacitance line drive signal (n=1 to N)
SL(m) video signal line (m=1 to M)
S(m) video signal (m=1 to M)
P(n,m) pixel formation portion (n=1 to N, m=1 to M)

BEST MODE FOR CARRYING OUT THE INVENTION

Hereinafter, embodiments of the present invention will be described with reference to the accompanying drawings. In the following description, the display portion is configured in a vertically-aligned, normally-black mode, and employs a so-called line-inversion drive method, which is a drive method in which voltage applied to the liquid crystal part of the pixel formation portion is inverted in polarity between adjacent rows and also frame by frame. Note that a so-called n-line inversion drive method may be employed in which the polarity is inverted every two rows or more.

<1. Overall Configuration and Operation of the Liquid Crystal Display Device>

FIG. 1 is a block diagram illustrating the overall configuration of an active-matrix liquid crystal display device according to an embodiment of the present invention. This liquid crystal display device includes a drive control portion and a display portion 700, the drive control portion consisting of a display control circuit 200, a source driver (video signal line driver circuit) 300, a gate driver (scanning signal line driver circuit) 400, an auxiliary capacitance line driver circuit 500, and a common electrode driver circuit 600.

The display portion 700 includes a plurality (M) of video signal lines SL(1) to SL(M), a plurality (N) of scanning signal lines GL(1) to GL(N), a plurality (N) of auxiliary capacitance lines CsL(1) to CsL(N), and a plurality (M×N) of pixel formation portions provided along the video signal lines SL(1) to SL(M) and the scanning signal lines GL(1) to GL(N). Note that in the following description, the pixel formation portion provided in association with and in the vicinity of the intersection of the scanning signal line GL(n) and the video signal line SL(m) (in the figure, the pixel formation portion being located approximately to the bottom right of the intersection) is denoted by reference character "P(n,m)". FIG. 2 illustrates an equivalent circuit of the pixel formation portion P(n,m) in the display portion 700 of the present embodiment.

As shown in FIG. 2, the pixel formation portion P(n,m) is formed by a TFT 10, a pixel electrode Epix, a common electrode Ecom, and a liquid crystal layer, the TFT 10 being a switching element having a gate terminal connected to the scanning signal line GL(n) or the scanning signal line GL(n+1) adjacent thereto and a source terminal connected to the video signal line SL(m) passing through the intersection or the video signal line SL(m+1) adjacent thereto, the pixel electrode Epix being connected to a drain terminal of the TFT 10, the common electrode Ecom being provided in common to the pixel formation portions P(i,j) (i=1 to N, j=1 to M), the liquid crystal layer being an electro-optic element provided in common to the pixel formation portions P(i,j) (i=1 to N, j=1 to M) between the pixel electrode Epix and the common electrode Ecom.

Note that the pixel formation portions P(n,m) display either red (R), green (G), or blue (B), and are disposed in the order: R, G, and B in the directions along the scanning signal lines GL(1) to GL(N), while the pixel formation portions P(n,m) for displaying the same color lie along the video signal lines SL(1) to SL(M), as shown in FIG. 2.

In each pixel formation portion P(n,m), a liquid crystal capacitance (also referred to as a "pixel capacitance") Clc is formed by the pixel electrode Epix and the common electrode Ecom opposing thereto with respect to the liquid crystal layer. For each pixel electrode Epix, two video signal lines SL(m) and SL(m+1) are arranged so that the pixel electrode Epix is located therebetween, and the video signal line SL(m) is connected to the pixel electrode Epix via the TFT 10.

Also, each scanning signal line GL(n) has an auxiliary capacitance line CsL(n) formed in parallel thereto, and each pixel formation portion P(n,m) has an auxiliary capacitance Ccs formed between the pixel electrode Epix and the auxiliary capacitance line CsL(n).

The display control circuit 200 receives a display data signal DAT and a timing control signal TS, which are externally sent thereto, and outputs a digital image signal DV while outputting a source start pulse signal SSP, a source clock signal SCK, a latch strobe signal LS, a gate start pulse signal GSP, a gate clock signal GCK, an auxiliary capacitance line control signal Scs, and a common electrode control signal Sec in order to control the timing of displaying an image on the display portion 700.

The source driver 300 receives the digital image signal DV, the source start pulse signal SSP, the source clock signal SCK, and the latch strobe signal LS outputted from the display control circuit 200, and applies drive video signals S(1) to S(M) to the video signal lines SL(1) to SL(M), respectively, in order to charge the liquid crystal capacitance Clc of each pixel formation portion P(n,m) in the display portion 700. At this time, in the source driver 300, digital image signals DV indicating voltage to be applied to the video signal lines SL(1) to SL(M) are sequentially stored at the time of generating pulses of the source clock signal SCK. Then, the stored digital image signals DV are converted to analog voltage at the time of generating pulses of the latch strobe signal LS.

Note that such D/A conversion is performed by a D/A conversion circuit (and a tone voltage generation circuit) included in the source driver 300. For example, the D/A conversion circuit divides a reference voltage for tone voltage generation supplied from outside the source driver 300, thereby generating analog voltage corresponding to each display tone. The analog voltage generated by the D/A conversion circuit is applied as a drive video signal simultaneously to all the video signal lines SL(1) to SL(M). That is, in the present embodiment, a line-sequential drive method is employed as a method for driving the video signal lines SL(1) to SL(M).

The gate driver 400 sequentially outputs active scanning signals G(1) to G(N) to the scanning signal lines GL(1) to GL(N), respectively, based on the gate start pulse signal GSP and the gate clock signal GCK outputted from the display control circuit 200.

The auxiliary capacitance line driver circuit 500 sequentially applies auxiliary capacitance line drive signals Cs(1) to Cs(N) to the auxiliary capacitance lines CsL(1) to CsL(N), respectively, based on the auxiliary capacitance line control signal Scs outputted from the display control circuit 200, the auxiliary capacitance line drive signals each having their potential changed in two steps in accordance with a potential supplied from an unillustrated power supply circuit. Note that the auxiliary capacitance line control signal Scs contains, for example, a start pulse signal and a clock signal, which correspond to the gate start pulse signal GSP and the gate clock signal GCK, respectively, and also contains a signal indicating the timing of polarity inversion (or the aforementioned potential selection).

Based on the common electrode control signal Sec outputted from the display control circuit 200, the common electrode driver circuit 600 applies to the common electrode a potential changing in two steps in accordance with the potential supplied from the unillustrated power supply circuit, such that the polarity of the voltage to be applied to the liquid crystal is inverted in accordance with a change of the video signal S(m). Note that the common electrode control signal Sec contains, for example, a clock signal, which corresponds to the source clock signal SCK, and a signal indicating the timing of polarity inversion (or the aforementioned potential selection).

Here, as is apparent from the relationship of connections shown in FIG. 2, when the voltage applied to the auxiliary capacitance lines CsL(1) to CsL(N) is changed, the potential of the pixel electrode Epix, when conforming to the common electrode Ecom, changes in response to the potential change of the auxiliary capacitance line CsL(n), in accordance with the ratio of the auxiliary capacitance to the sum of the liquid crystal capacitance value and the auxiliary capacitance value. As a result, the difference between the common potential Vcom and the pixel electrode potential of each pixel formation portion can be increased for the white display (in other words, the pixel electrode voltage can be padded). The signal will be described later in terms of its waveform and so on.

In this manner, the drive video signal is applied to each of the video signal lines SL(1) to SL(M), the scanning signal to each of the scanning signal lines GL(1) to GL(N), and the auxiliary capacitance line drive signal to each of the auxiliary capacitance lines CsL(1) to CsL(N), so that an image is displayed on the display portion 700. Next, the potential change of various signals and the like will be described with reference to FIGS. 3 and 4.

<2. Waveforms of Various Signals and the Like>

Figure 3:
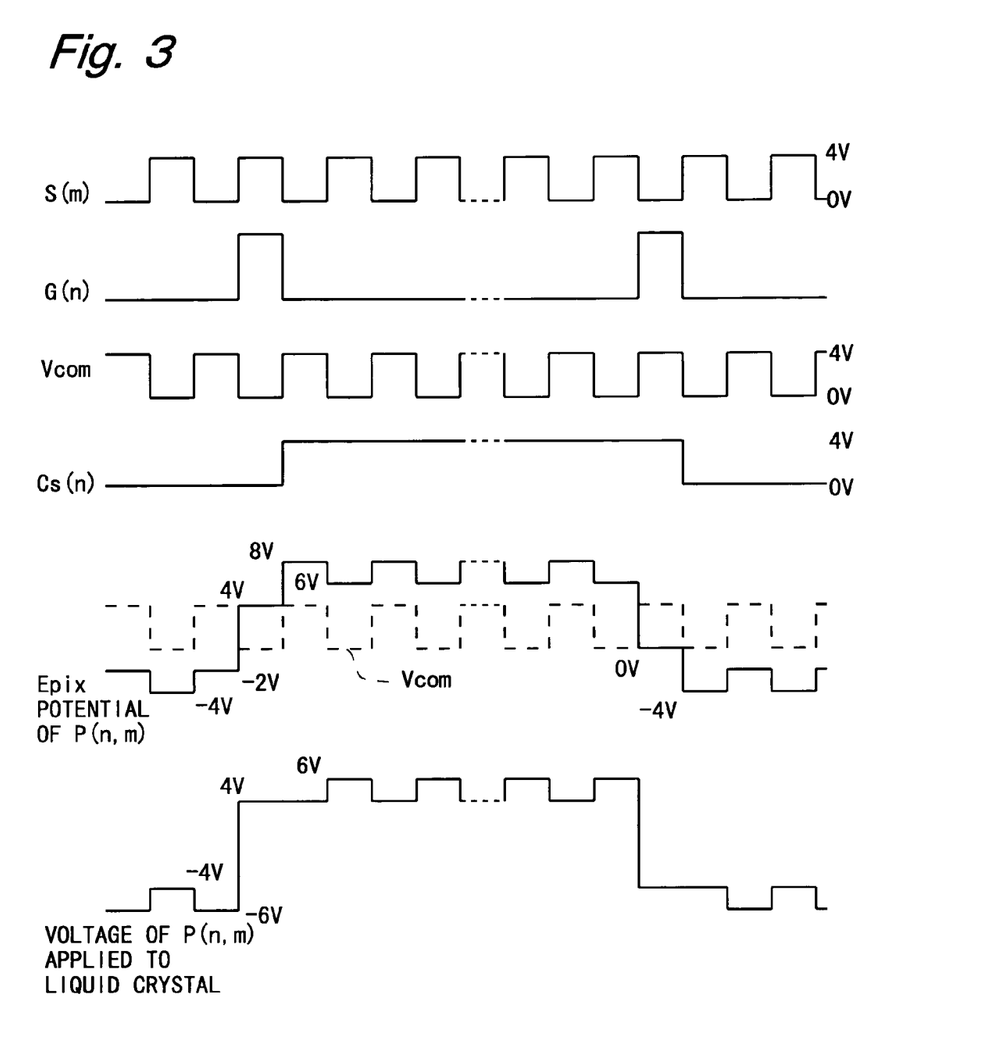
FIG. 3 provides waveform charts of various signals and the like for providing a white display in the embodiment.
Figure 4:
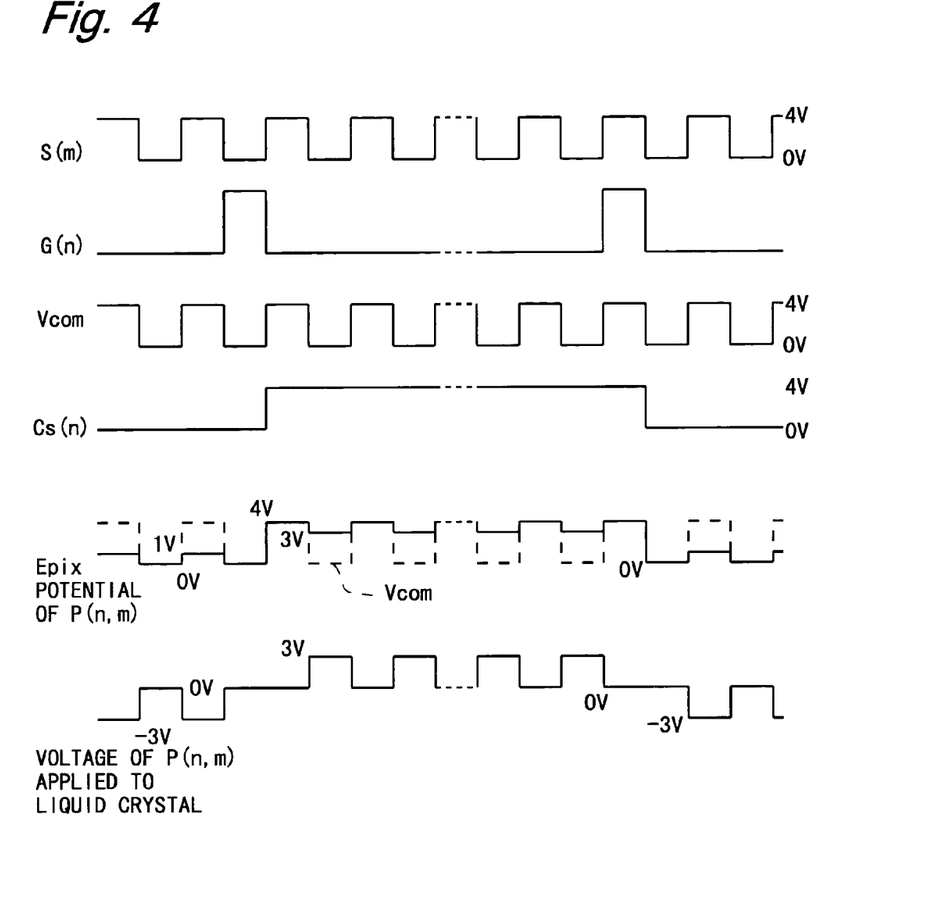
FIG. 4 provides waveform charts of various signals and the like for providing a black display in the embodiment.

FIG. 3 provides waveform charts of various signals and the like for providing a white display by the present liquid crystal display device. Also, FIG. 4 provides waveform charts of various signals and the like for providing a black display by the present liquid crystal display device. As shown in FIGS. 3 and 4, the video signal S(m), which is a voltage signal to be applied to the video signal line SL(m), has a predetermined voltage value in the range of ±4V in accordance with a pixel luminance from 0V to 4V; specifically, in the case of the positive polarity, voltage values corresponding to the black display (minimum luminance) and the white display (maximum luminance) are 0V and 4V, respectively, and in the case of the negative polarity, voltage values corresponding to the black display (minimum luminance) and the white display (maximum luminance) are 4V and 0V, respectively. Note that by setting the lowest voltage of the video signal S(m) to 0V, it becomes possible to suppress power consumption as a whole.

Also, as for the liquid crystal layer, alternating current drive is required for preventing time degradation, as described above, the common potential Vcom, which is the potential of the common electrode Ecom, is changed to 0V for the positive polarity and 4V for the negative polarity in accordance with the change of the video signal S(m), such that the voltage applied to the liquid crystal is inverted in polarity. Accordingly, for example, the common potential Vcom is changed so as to be in opposite phase to but at the same amplitude as the video signal S(m) for the case where the white display is always provided.

Here, in the normally-black liquid crystal display device, an applied voltage of approximately 5V (here, simply 5V) is typically required for maximizing the transmittance of the liquid crystal layer, and therefore, as in the aforementioned liquid crystal display device in the first conventional art example, by driving the auxiliary capacitance line CsL(n), the potential of the pixel electrode is changed. Specifically, the potential of the pixel electrode Epix, when conforming to the common electrode Ecom, changes in response to the potential change of the auxiliary capacitance line CsL(n), in accordance with the ratio of the auxiliary capacitance to the sum of the liquid crystal capacitance value and the auxiliary capacitance value.

Therefore, for example, in the case of the white display shown in FIG. 3, if the common potential Vcom remains unchanged, and only the potential of a signal (hereinafter, referred to as an "auxiliary capacitance line drive signal") Cs(n) to be supplied to the auxiliary capacitance line is changed by 4V, the potential of the pixel electrode Epix is changed by 2V provided that the liquid crystal capacitance value Clc: the auxiliary capacitance value Ccs=1:1, i.e., Ccs/(Ccs+Clc)=0.5. Note that the ratio is a value for the white display, and as for the black display, the dielectric constant of the liquid crystal is lower as described above, hence it is assumed here that Ccs/(Ccs+Clc)=0.75. The ratio for the black display will be described later with reference to FIG. 4.

Conversely, if the potential of the auxiliary capacitance line drive signal Cs(n) remains unchanged, and only the common potential Vcom is changed by 4V, the potential of the pixel electrode Epix is changed by 2V provided that Clc/(Ccs+Clc)=0.5.

Naturally, when both the potential of the auxiliary capacitance line drive signal Cs(n) and the common potential Vcom are changed by 4V, the potential of the pixel electrode Epix is changed by 4V as well. That is, the voltage applied to the liquid crystal remains unchanged.

Note that the auxiliary capacitance line drive signal Cs(n) is generated by the auxiliary capacitance line driver circuit 500 based on the auxiliary capacitance line control signal Scs, so as to fall or rise simultaneously with the fall of the scanning signal G(n), in the same direction as the potential change of the common potential Vcom. Concretely, as shown in FIG. 3, it falls simultaneously with the fall of the scanning signal G(n), and then rises simultaneously with the fall of the scanning signal G(n) in the next frame. More strictly, the auxiliary capacitance line drive signal Cs(n) falls when the TFT 10 is completely turned OFF, i.e., slightly after the fall of the scanning signal G(n), and then rises slightly after the fall of the scanning signal G(n) in the next frame. Also, the same can be said of the timing of the change in the common potential Vcom.

Also, as shown in FIG. 3, the pixel electrode potential of the pixel formation portion P(n,m) is maintained at 4V until the scanning signal G(n) transitions from the active state (where the TFT 10 is turned ON) to the non-active state, but thereafter it further rises by 4V to 8V because both the common potential Vcom and the potential of the auxiliary capacitance line drive signal Cs(n) are changed to rise by 4V. Since the common potential Vcom is 4V, the voltage applied to the liquid crystal layer at this time is maintained at 4V.

Here, in general, for example, as in the aforementioned second conventional art example, the voltage applied to the liquid crystal remains unchanged until the next frame is displayed, so that the pixel display is achieved with a luminance in accordance with the applied voltage. Specifically, in the case of conventional liquid crystal display devices including no auxiliary capacitance lines, the voltage applied to the liquid crystal naturally remains invariable from the time of application, and this is also true even in the case where the auxiliary capacitance lines are present as in the second conventional art example, provided that the potential of the lines varies simultaneously with the common potential by the same amount.

However, the present embodiment is significantly characterized in that the pixel electrode potential of the pixel formation portion P(n,m) is changed in accordance with subsequent changes of the common potential Vcom. Specifically, in the case as shown in FIG. 3 where the potential of the auxiliary capacitance line drive signal Cs(n) is not changed from 4V (it remains unchanged), and only the common potential Vcom falls by 4V, the potential of the pixel electrode Epix falls by 2V from 8V to 6V provided that Clc/(Ccs+Clc)=0.5. As a result, the voltage applied to the liquid crystal rises from 4V to 6V. In this manner, by increasing the voltage applied to the liquid crystal, it is possible to raise the maximum absolute value of the voltage applied to the liquid crystal higher than the maximum value of the drive voltage for conventional liquid crystal display devices driven while inverting the common potential (e.g., the aforementioned second conventional art example).

Thereafter, when only the common potential Vcom rises by 4V with the potential of the auxiliary capacitance line drive signal Cs(n) being not changed (with the potential remaining unchanged), the potential of the pixel electrode Epix rises by 2V to 8V, and the voltage applied to the liquid crystal falls to 4V.

In this manner, the common electrode is driven with the potential of the auxiliary capacitance line remaining unchanged, so that the voltage applied to the liquid crystal alternates between 4V and 6V every scanning period until the next frame is displayed. However, such a change is not reflected on the display, so that the display state is not changed. The reason for this is that the length of a scanning period in typical liquid crystal display devices is about tens to hundreds of microseconds, but in general, liquid crystal molecules take about 10 milliseconds to change their orientational state. For this reason, the orientational state of the liquid crystal molecules depends on the effective value (average value) of the applied voltage. Accordingly, the above case where the voltage applied to the liquid crystal alternates between 4V and 6V every scanning period can be considered as being the same as the case where a constant voltage of 5V is always applied to the liquid crystal. Thus, in this case, the optical transmittance of the liquid crystal layer is always 100%, making it possible to stably provide the white display.

When the white display is always provided, the operation is performed as described above in conjunction with FIG. 3; an example where the black display is always provided will be described next with reference to FIG. 4. As shown in FIG. 4, the pixel electrode potential of the pixel formation portion P(n,m) is maintained at 0V until the scanning signal G(n) transitions from the active state (where the TFT 10 is turned ON) to the non-active state, and thereafter it rises by 4V from 0V to 4V because both the common potential Vcom and the potential of the auxiliary capacitance line drive signal Cs(n) rise by 4V. Since the common potential Vcom is 4V, the voltage applied to the liquid crystal layer at this time is maintained at 0V.

Thereafter, when only the common potential Vcom falls by 4V with the potential of the auxiliary capacitance line drive signal Cs(n) being not changed from 4V (with the potential remaining unchanged), as shown in FIG. 4, if Ccs/(Ccs+Clc) =0.75 as described above, Clc/(Ccs+Clc)=0.25, and therefore the potential of the pixel electrode Epix falls by 1V from 4V to 3V, so that the voltage applied to the liquid crystal rises to 3V. Subsequently, when only the common potential Vcom rises by 4V with the potential of the auxiliary capacitance line drive signal Cs(n) being not changed (with the potential remaining unchanged), the potential of the pixel electrode Epix rises by 1V from 3V to 4V, so that the voltage applied to the liquid crystal falls to 0V.

In this manner, the voltage applied to the liquid crystal alternates between 0V and 3V every scanning period until the next frame is displayed. Accordingly, this state can be considered as being the same as the case where a constant voltage of 1.5V is always applied to the liquid crystal. This voltage has a value equal to or less than a liquid crystal threshold voltage, or at least close to that liquid crystal threshold voltage. Hereinafter, the liquid crystal threshold voltage will be described with reference to FIG. 5.

Figure 5:
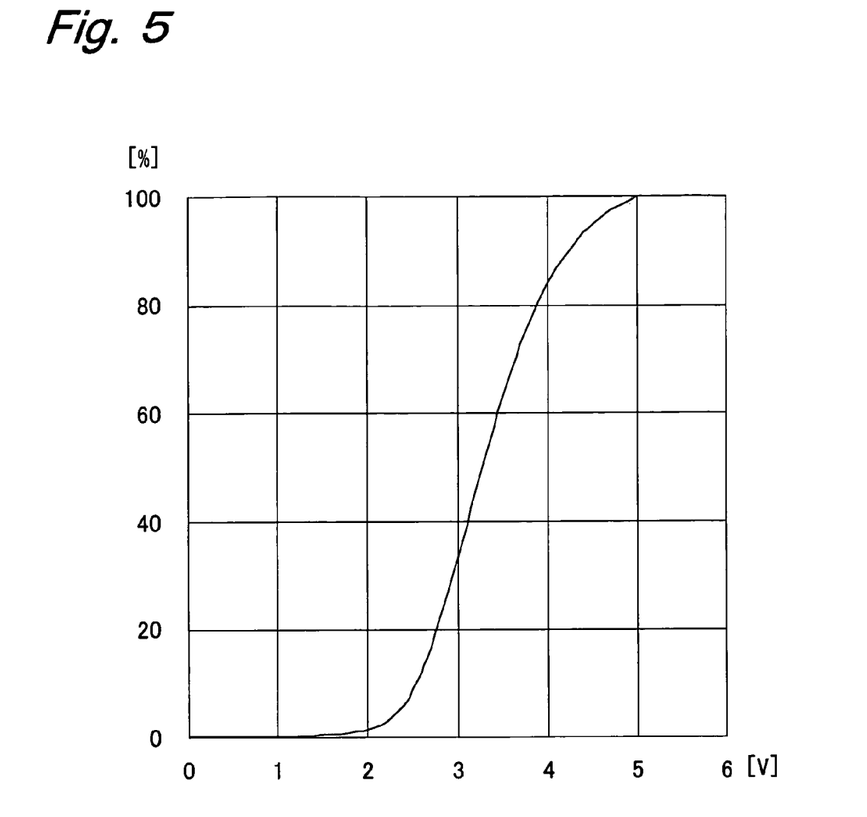
FIG. 5 is a graph illustrating the relationship between voltage applied to a liquid crystal layer and optical transmittance of the liquid crystal layer in the embodiment.

FIG. 5 is a graph illustrating the relationship between the voltage applied to the liquid crystal layer and the optical transmittance of the liquid crystal layer. Note that in the figure, the vertical axis denotes the optical transmittance [%], and the horizontal axis denotes the applied voltage [V]. Referring to FIG. 5, it can be appreciated that almost no light is transmitted (the optical transmittance hardly changes from 0%) if a voltage of up to about 1.5V is applied to the liquid crystal layer. The maximum voltage applied to the liquid crystal which achieves an optical transmittance of about 0% and causes almost no perceivable change from 0% is referred to as the liquid crystal threshold voltage. Accordingly, when the difference between the potential of the pixel electrode Epix and the common potential Vcom is equal to or less than the liquid crystal threshold voltage, i.e., about 1.5V, almost no display is provided (i.e., the black display is provided) as in the case where the difference is 0V. Note that the relationship shown in FIG. 5 is merely an example, and although, for example, the applied voltage that achieves an optical transmittance of 100% may vary depending on, for instance, liquid crystal compositions, in general, the optical transmittance of any liquid crystal hardly changes if the voltage is at a predetermined threshold level or lower. Thus, as described above, when the voltage applied to the liquid crystal is 1.5V, the optical transmittance of the liquid crystal layer is always almost 0%, making it possible to stably provide the black display.

A similar operation is performed as well for both the pixel formation portion P(n+1,m) in the next row and the pixel formation portion P(n,m) in the next frame where the polarity is inverted in accordance with the aforementioned line-inversion drive method.

While the foregoing description has been provided with respect to typical examples where the white display is always provided and where the black display is always provided, it is understood that the foregoing description is also applicable to cases where displays of intermediate tones are provided. However, as described above, the dielectric constant of the liquid crystal depends on the display state, and therefore in order to match the voltage of the video signal S(m) and the display tone, it is necessary to take into consideration the dielectric constant of the liquid crystal changing in accordance with the applied voltage, along with the effective value of the voltage applied to the liquid crystal.

<3. Effects>

As described above, in the present embodiment, when the auxiliary capacitance lines CsL(1) to CsL(n) are driven, the range of the voltage for driving them, the range of the voltage for driving the video signal lines SL(1) to SL(M), and the range of the voltage for driving the common electrode Ecom are equally maintained as low as from 0V to 4V, making it possible to facilitate power supply design and voltage withstanding design for the source driver 300, the auxiliary capacitance line driver circuit 500, and the common electrode driver circuit 600, thereby reducing production cost and power consumption. With such a configuration, where the potential of the auxiliary capacitance line drive signal Cs(n) is prevented from fluctuating with the common potential Vcom by minimizing the range of the drive voltage and increasing the auxiliary capacitance value without reducing the pixel aperture ratio, it is possible to drive the auxiliary capacitance lines with the (effective) voltage to be applied to the liquid crystal being set with a maximum absolute value of 5V and a minimum absolute value of 1.5V so that the difference between the maximum and minimum absolute values is 3.5V (i.e., the dynamic range is widened), which is greater compared to conventional liquid crystal display devices in which the auxiliary capacitance lines are driven with the common potential being fixed.

Here, the reason why the dynamic range is widened as described above is that the present embodiment focuses on the point that the dielectric anisotropy of the liquid crystal acts in a direction to widen the dynamic range, as opposed to the first conventional art example shown in FIG. 7 in which the dielectric anisotropy of the liquid crystal acts in a direction to narrow the dynamic range. Specifically, as for the first conventional art example, the potential of the auxiliary capacitance line drive signal Cs(n) is changed with the common potential Vcom being fixed, so that it is concerned with the ratio of the auxiliary capacitance Ccs to the sum total of the liquid crystal capacitance Clc and the auxiliary capacitance Ccs, while as for the present embodiment, the common potential Vcom is changed with the potential of the auxiliary capacitance line drive signal Cs(n) being shifted and fixed thereafter, so that it is concerned with the ratio of the liquid crystal capacitance Clc to the sum total of the liquid crystal capacitance Clc and the auxiliary capacitance Ccs. In this manner, with the above configuration taking advantage of the dielectric anisotropy of the liquid crystal acting in a direction opposite to that in the first conventional art example, it is possible to achieve the effect of widening the dynamic range.

Also, compared with conventional liquid crystal display devices driven with the common potential being inverted, production cost can be reduced with power supply design of driver circuits being facilitated by equalizing their drive voltages, and furthermore, the maximum absolute value of the voltage to be applied to the liquid crystal can be rendered higher than the maximum values of the drive voltages for the driver circuits.

<4. Variants>

In the above embodiment, the voltage applied to the video signal lines SL(1) to SL(M), the voltage applied to the auxiliary capacitance lines CsL(1) to CsL(N), and the voltage applied to the common potential Vcom are equal in minimum and maximum values, which are 0V and 4V, respectively, but they may be different. So long as part or all of them are equal, types of output voltage can be reduced, making it possible to facilitate power supply design and thereby to reduce production cost. Also, their minimum values may not necessarily be 0V. However, if they are 0V, power consumption can be minimized, making it possible to reduce power consumption and facilitate power supply design. Furthermore, the maximum values may not necessarily be 4V. However, the maximum value of the voltage applied to the liquid crystal is preferably about 4V in view of the fact that it is suitably equal to a point between the liquid crystal threshold voltage and about 5V within the range of the applied voltage absolute value, and in consideration of restrictions on, for example, production processes.

In the above embodiment, the auxiliary capacitance line drive signal Cs(n) rises or falls in the same direction as the change of the common potential Vcom, simultaneously with the fall of the scanning signal G(n) (to be exact, slightly after that), but this timing is not restrictive, and the auxiliary capacitance line drive signal Cs(n) may rise or fall after a lapse of a predetermined period since the fall of the scanning signal G(n) so long as it is changed in the same direction as the change of the common potential Vcom at the same time as or immediately after the fall of the scanning signal G(n). However, the display is more stabilized the longer the period in which the effective value of the voltage applied to the liquid crystal is kept constant at a desired level, and therefore the auxiliary capacitance line drive signal Cs(n) preferably rises or falls at the same time as or immediately after the fall of the scanning signal G(n).

In the above embodiment, the potential of the auxiliary capacitance lines CsL(1) to CsL(N) is changed in two steps, but it may be changed in three steps or more as with well-known configurations. For example, in the configuration where their potential is changed in three steps, it is possible to compensate for any change of the pixel electrode potential due to the potential change of the scanning signal line caused by any parasitic capacitance between the scanning signal line and the pixel electrode, and it is also possible to compensate for any error of luminance between the polarities of the voltage applied to the liquid crystal. Concretely, the potential to be changed in three steps is suitably set considering the amount of change in potential of the pixel electrode Epix in the pixel formation portion P(n,m) due to (the potential change caused by) the falling pulse of the scanning signal G(n), as well as positive and negative voltages to be applied in accordance with a desired luminance, making it possible to preclude any effects due to the scanning signal line potential change and the polarity of the voltage applied to the liquid crystal.

INDUSTRIAL APPLICABILITY

The present invention is applicable to active-matrix liquid crystal display devices using switching elements, such as thin-film transistors, in which auxiliary capacitance lines are driven.

The invention claimed is:

1. An active-matrix liquid crystal display device, comprising:
   a video signal line driver circuit for driving a plurality of video signal lines transmitting a plurality of video signals corresponding to image signals externally provided for displaying an image;
   a scanning signal line driver circuit for driving a plurality of scanning signal lines crossing the video signal lines;
   an auxiliary capacitance line driver circuit for driving a plurality of auxiliary capacitance lines arranged along their corresponding scanning signal lines;
   a plurality of pixel formation portions arranged in a matrix along the video signal lines and the scanning signal lines; and
   a common electrode driver circuit for driving a common electrode supplying a common potential to the pixel formation portions;
   wherein each of the pixel formation portions includes a pixel electrode connected to a corresponding one of the video signal lines, the pixel electrode having an auxiliary capacitance formed between the pixel electrode and its corresponding auxiliary capacitance line and also having a liquid crystal interposed between the pixel electrode and the common electrode,
   wherein the common electrode driver circuit alternatingly applies a first potential and a second potential, where the second potential is greater than the first potential, to the common electrode each time one of the scanning signal lines is selectively driven by the scanning signal line driver circuit or at each interval between more than one scanning signal line being driven by the scanning signal line driver circuit, and
   wherein the auxiliary capacitance line driver circuit drives the auxiliary capacitance lines by applying a third potential or a fourth potential greater than the third potential at or after a first time point subsequent to selection of a corresponding scanning signal line by the scanning signal line driver circuit, the corresponding scanning signal line transitioning at the first time point from a selected state to a deselected state, such that the applied potential is changed in a same direction as a direction in which the potential of the common electrode is changed at or immediately after the first time point, the applied potential being maintained for a period until a second time point subsequent to a next selection of the corresponding scanning signal line or until a time point before and close to the second time point, the corresponding scanning signal line transitioning at the second time point from the selected state to the deselected state.

2. The liquid crystal display device according to claim 1, wherein at least two of a fifth potential, which is a minimum value of the video signals, the first potential, and the third potential are approximately equal.

3. The liquid crystal display device according to claim 2, wherein at least two of the fifth potential, which is the minimum value of the video signals, the first potential, and the third potential are 0V or values close to 0V.

4. The liquid crystal display device according to claim 1, wherein at least two of a sixth potential, which is a maximum value of the video signals, the second potential, and the fourth potential are approximately equal.

5. The liquid crystal display device according to claim 4, wherein at least two of the sixth potential, which is the maximum value of the video signals, the second potential, and the fourth potential are values lower than an absolute value of a minimum applied voltage allowing the liquid crystal to have an optical transmittance close to 100%.

6. The liquid crystal display device according to claim 4, wherein at least two of the sixth potential, which is the maximum value of the video signals, the second potential, and the fourth potential are 4V or values close to 4V.

7. The liquid crystal display device according to claim 1, wherein the first potential is 0V or a value close to 0V.

8. The liquid crystal display device according to claim 1, wherein the third potential is 0V or a value close to 0V.

9. The liquid crystal display device according to claim 1, wherein the second potential is 4V or a value close to 4V.

10. The liquid crystal display device according to claim 1, wherein the fourth potential is 4V or a value close to 4V.

11. A method for driving a liquid crystal display device including a plurality of video signal lines transmitting a plurality of video signals corresponding to image signals externally provided for displaying an image, a plurality of scanning signal lines crossing the video signal lines, a plurality of auxiliary capacitance lines arranged along their corresponding scanning signal lines, a common electrode supplying a common potential, and a plurality of pixel formation portions arranged in a matrix along the video signal lines and the scanning signal lines, each of the pixel formation portions including a pixel electrode connected to a corresponding one of the video signal lines, the pixel electrode having an auxiliary capacitance formed between the pixel electrode and its corresponding auxiliary capacitance line and also having a liquid crystal interposed between the pixel electrode and the common electrode, the method comprising:
   a video signal line drive step for driving the video signal lines;
   a scanning signal line drive step for driving the scanning signal lines;
   an auxiliary capacitance line drive step for driving the auxiliary capacitance lines; and
   a common electrode drive step for driving the common electrode;
   wherein in the common electrode drive step, a first potential and a second potential, where the second potential is greater than the first potential, are alternatingly applied to the common electrode each time one of the scanning signal lines is selectively driven in the scanning signal line drive step or at each interval between more than one scanning signal line being driven in the scanning signal line drive step, and
   wherein in the auxiliary capacitance line drive step, the auxiliary capacitance lines are driven by applying a third potential or a fourth potential greater than the third potential at or after a first time point subsequent to selection of a corresponding scanning signal line in the scanning signal line drive step, the corresponding scanning signal line transitioning at the first time point from a selected state to a deselected state, such that the applied potential is changed in a same direction as a direction in which the potential of the common electrode is changed at or immediately after the first time point, the applied potential being maintained for a period until a second time point subsequent to a next selection of the corresponding scanning signal line or until a time point before and close to the second time point, the corresponding scanning signal line transitioning at the second time point from the selected state to the deselected state.

12. The method according to claim 11, wherein at least two of a fifth potential, which is a minimum value of the video signals, the first potential, and the third potential are approximately equal.

13. The method according to claim 12, wherein at least two of the fifth potential, which is the minimum value of the video signals, the first potential, and the third potential are 0V or values close to 0V.

14. The method according to claim 11, wherein at least two of a sixth potential, which is a maximum value of the video signals, the second potential, and the fourth potential are approximately equal.

15. The method according to claim 14, wherein at least two of the sixth potential, which is the maximum value of the video signals, the second potential, and the fourth potential are values lower than an absolute value of a minimum applied voltage allowing the liquid crystal to have an optical transmittance close to 100%.

16. The method according to claim 14, wherein at least two of the sixth potential, which is the maximum value of the video signals, the second potential, and the fourth potential are 4V or values close to 4V.

17. The method according to claim 11, wherein the first potential is 0V or a value close to 0V.

18. The method according to claim 11, wherein the third potential is 0V or a value close to 0V.

19. The method according to claim 11, wherein the second potential is 4V or a value close to 4V.

20. The method according to claim 11, wherein the fourth potential is 4V or a value close to 4V.

* * * * *